United States Patent
de Groot

(10) Patent No.: US 11,759,758 B2
(45) Date of Patent: Sep. 19, 2023

(54) BLOCK COPOLYMERS FOR GEL COMPOSITIONS WITH IMPROVED EFFICIENCY

(71) Applicant: KRATON POLYMERS LLC, Houston, TX (US)

(72) Inventor: Hendrik de Groot, Mont St. Guibert (BE)

(73) Assignee: KRATON CORPORATION, Houston, TX (US)

( * ) Notice: Subject to any disclaimer, the term of this patent is extended or adjusted under 35 U.S.C. 154(b) by 1197 days.

(21) Appl. No.: 16/379,879

(22) Filed: Apr. 10, 2019

(65) Prior Publication Data

US 2019/0329207 A1    Oct. 31, 2019

Related U.S. Application Data

(60) Provisional application No. 62/664,413, filed on Apr. 30, 2018.

(51) Int. Cl.

| | | |
|---|---|---|
| C09D 5/08 | (2006.01) | |
| B01J 13/00 | (2006.01) | |
| B29D 99/00 | (2010.01) | |
| C08F 297/04 | (2006.01) | |
| C09D 153/02 | (2006.01) | |
| C08L 91/06 | (2006.01) | |
| C08L 53/02 | (2006.01) | |
| B29K 105/00 | (2006.01) | |

(52) U.S. Cl.
CPC ...... B01J 13/0065 (2013.01); B29D 99/0078 (2013.01); C08F 297/046 (2013.01); C08L 53/025 (2013.01); C08L 91/06 (2013.01); C09D 5/08 (2013.01); C09D 153/02 (2013.01); *B29K 2105/0061* (2013.01)

(58) Field of Classification Search
CPC ... C09D 153/02; C08F 297/046; C08L 53/025
See application file for complete search history.

(56) References Cited

U.S. PATENT DOCUMENTS

| 3,595,942 | A | 7/1971 | Wald et al. | |
|---|---|---|---|---|
| 3,634,549 | A | 1/1972 | Shaw et al. | |
| 3,670,054 | A | 6/1972 | De la Mare et al. | |
| 3,700,633 | A | 10/1972 | Wald et al. | |
| 5,541,250 | A | 7/1996 | Hudson et al. | |
| 6,165,309 | A * | 12/2000 | Burnell | B32B 31/20 |
| | | | | 156/308.2 |
| 7,220,798 | B2 | 5/2007 | Atwood et al. | |
| 2006/0205849 | A1 | 9/2006 | St. Clair | |
| 2015/0219796 | A1 | 8/2015 | Salazar | |
| 2016/0362545 | A1 | 12/2016 | Bening et al. | |
| 2017/0313930 | A1* | 11/2017 | Patel | C09K 8/68 |
| 2018/0223140 | A1* | 8/2018 | Asako | C09J 153/02 |

FOREIGN PATENT DOCUMENTS

| CN | 1643067 | A | | 7/2005 | |
|---|---|---|---|---|---|
| CN | 1735659 | A | | 2/2006 | |
| CN | 105980449 | A | | 9/2016 | |
| TW | 200920754 | A | | 5/2009 | |
| WO | WO2016031550 | A1 | * | 3/2016 | ............... C08L 53/02 |
| WO | WO2016100690 | | * | 6/2016 | ............... A61K 8/89 |
| WO | WO2017064094 | A1 | | 4/2017 | |
| WO | WO2018013853 | A1 | | 1/2018 | |

OTHER PUBLICATIONS

Rick W. Vallier, Policy for Post-Tensioning Tendons Flexible Filler, FTBA Construction Conference, Feb. 17-18, 2015.

* cited by examiner

*Primary Examiner* — Ling Siu Choi
*Assistant Examiner* — Huihong Qiao
(74) *Attorney, Agent, or Firm* — Beth Haslam

(57) ABSTRACT

An oil gel compositions comprising (i) between 10 to 20 wt. % of a selectively hydrogenated styrenic block copolymer, (ii) an oil, and (iii) optional additives is described herein. In embodiments, the oil gel composition is characterized as having, a viscosity at 25° C. and 10/s between 100 (See claim 2) and 200 Pa-s, a cone penetration at 25° C. from 200 dmm to 600 dmm, a drop point from 100 to 250° C., and oil separation at 100° C. from 0% to 2%. In embodiments, the oil gel composition has a viscosity ratio of 25° C./100° C. from 4 to 20 at 10/s shear rate. The oil gel composition can be used in cables for post tensioning applications.

16 Claims, No Drawings

BLOCK COPOLYMERS FOR GEL COMPOSITIONS WITH IMPROVED EFFICIENCY

RELATED APPLICATIONS

This application claims priority from U.S. Application No. 62/664,413, with a filing date of Apr. 30, 2018, the disclosures is incorporated herein by reference.

TECHNICAL FIELD

The disclosure relates to compositions and methods for the preparation of gel compositions comprising styrenic block copolymers.

BACKGROUND

A variety of materials (e.g., optical fiber cables, concrete, etc. . . . ) are subjected to stresses during their manufacture, installation, and/or operation that may compromise their intended function. Reinforcing and or protective materials are often introduced to provide a composite structure that serves to mitigate the detrimental effects of the stresses on the material's intended function. For example, in optical fiber cables a plurality of cables are enclosed together in an extended plastic tube. A protective gel composition is also present that functions to protect both the structural and functional integrity of the optical cables. As another example, post-tensioning cables used in the concrete reinforcement often contain a plurality of wires that can be protected utilizing a gel composition.

WO2017/064094 describe the benefits and suitability for anticorrosion gels in unbonded external post-tensioning applications, comprising a base oil, polymer, and anticorrosion additives, with thixotropic behavior and lack of oil separation from the polymer.

There exists an ongoing need for improved gel compositions that function to protect the structural and functional integrity of optical fiber cables and post-tensioning systems, while finding utility in other applications and bring improved efficiency to the gel composition performance.

SUMMARY

In one aspect, the disclosure relates to an oil gel composition. The oil gel composition comprises: 80 to 93 wt. % oil; between 7 to 20 wt. % of a selectively hydrogenated styrenic block copolymer consisting essentially of a diblock copolymer of formula A-B, where A block comprises polymerized monoalkenyl arene units or a combination of polymerized monoalkenyl arene units and diene units, wherein B block comprises polydiene or a combination of polymerized mixed diene units, wherein the styrenic block copolymer has molecular weight from 80 kg/mol to 150 kg/mol, and a polystyrene content from 15% to 40%; up to 10 wt. % of optional additives; and wherein the oil gel composition is characterized by: a drop point from 100 to 250° C., oil separation at 100 C from 0% to 2%, and a ratio of viscosity measured at 25° C. at 10/s shear rate to viscosity measured at 100° C. at 10/s shear rate ranging from 4:1 to 20:1.

DESCRIPTION

Molecular weights used herein are polystyrene equivalent molecular weights and can be measured by Gel Permeation Chromatography (GPC), the reported values represent the molecular weight at the peak of the distribution, sometimes referred to as peak molecular weight. Polymers of known molecular weight are used for calibration and these must be of the same molecular structure and chemical composition as the unknown polymers that are to be measured.

"Vinyl" describes the polymer product that is made when 1,3-butadiene is polymerized via a 1,2-addition mechanism. The result is a monosubstituted olefin group pendant to the polymer backbone, a vinyl group. In the case of anionic polymerization of isoprene, insertion of the isoprene via a 3,4, addition mechanism affords a geminal dialkyl C=C moiety pendant to the polymer backbone. The effects of the 3,4-addition polymerization of isoprene on the final properties of the block copolymer will be similar to those from 1,2-addition of butadiene.

The polystyrene content (PSC) in block copolymers may be determined using proton nuclear magnetic resonance (NMR).

Oil separation refers to the phenomenon of static oil bleed or oil puddling where oil is released from a thickening matrix associated with a grease where a grease herein refers to an oily material.

Viscosities can be measured as dynamic viscosities measured at 25° C. with a shear ramp applied, at 6, 10, 20, 50, 100 and 200 s$^{-1}$. At a shear rate of 10/s, oil gels can be tested for the dynamic viscosity at 25 and 100° C., using a rheometer in a cone/plane geometry configuration. The cone has a 20 mm diameter and 1 degree angle. Viscosity units are mPa·s or Pa·s.

Thixotropic ratio is defined as the viscosity at 6/s divided by the viscosity at 200/s.

Oil separation can be determined in accordance with ASTM 6184, FED 321.3 at 80° C. and 24 hours.

The drop point refers to the temperature at which an oleaginous material passes from a semi-solid to a liquid state under specific test conditions, which can determined in accordance with ASTM D 566.

Cone penetration can be determined using a penetrometer in accordance with ASTM 937, GBT 269-91 at temperatures of 25±2° C. and the average of three determinations recorded.

Disclosed herein are compositions comprising i) a styrenic block copolymer, ii) an oil and optionally iii) additives. Such materials may find utility as gel compositions that display improved thickening, broad compatibility with a variety of oils, and temperature resistance where the styrenic block copolymer exhibits improved thickening efficiency.

Styrenic Block Copolymer (SBC) Component: The SBC suitable for use contains a polymer block predominantly derived from a monovinylaromatic compound, denoted an A block, and a polymer block predominantly derived from dienes, denoted a B block.

In embodiments, having a formula "A-B." In embodiments, the A block can have either polymerized monoalkenyl arene units, or a combination of polymerized monoalkenyl arene units and diene units. In embodiments, the monoalkenyl arene comprises styrene, alpha-methylstyrene, para-methylstyrene, vinyl toluene, vinylnaphthalene, diphenyl ethylene, para-butyl styrene, or mixtures thereof; alternatively the A block comprises styrene.

In embodiments, the B block comprises polydiene or a mixture of conjugated 1,3-butadiene and isoprene copolymerized together. "Butadiene" refers to "1,3-butadiene" and "isoprene" refers to "2-methyl-1,3-butadiene." The ratio of butadiene to isoprene in the B block may be 2:98 to 98:2, more preferably 5:95 to 60:40, most preferably 10:90 to 40:60.

The molecular weight of the SB (S block+B block) in one embodiment ranges from from 80 kg/mole to 150 kg/mol, alternatively from 100 kg/mol to 130 kg/mol, or at least 125 kg/mol.

In embodiments, the SBC has a polystyrene content (PSC) from 10% to 40% based on the range of polystyrene contents shown to produce gels with good shear thinning performance, and acceptable cone penetration and drop point values, alternatively the PSC ranges from 12 to 35%, or from 15 to 35%, or from 25 to 30%.

In embodiments, the vinyl content of the mixed conjugated diene in the B block ranges from 5% to 20%.

In embodiments, the SBC is a selectively hydrogenated styrene-butadiene/isoprene copolymer with a butadiene/isoprene ratio=20/80, and apparent molecular weight ranging from 120 to 130 kg/mol. In embodiments, the SBC is a hydrogenated styrene-butadiene-co-isoprene diblock copolymer. In another embodiment, the SB is a diblock copolymer having less than 5 wt. % of a triblock copolymer present (e.g., SEBS) based on the total weight of the styrenic block copolymer composition, alternatively less than 2 wt. %, or alternatively less than 1 wt. %.

Polymerization conditions to prepare the SBC are similar to those used for anionic polymerizations. For example, the polymerization may be carried out at a temperature from −30° C. to 150° C. in an inert atmosphere such as nitrogen, under a pressure within the range from 0.5 to 10 bars. Suitable reaction conditions also include one or more polymerization initiators, for example, alkyl lithium compounds such as s-butyllithium, n-butyllithium, t-butyllithium, amyllithium and the like. Disclosure on the preparation can be found in U.S. Pat. No. 7,220,798, incorporated herein by reference.

The hydrogenation can be carried out via any suitable hydrogenation or selective hydrogenation process as disclosed in U.S. Pat. Nos. 3,595,942; 3,634,549; 3,670,054; and 3,700,633, incorporated herein by reference. Methods to hydrogenate polymers containing aromatic or ethylenic unsaturation based upon operation of a suitable catalyst may be employed. Catalyst, or catalyst precursor, may comprise a Group VIII metal such as nickel or cobalt combined with a suitable reducing agent such as an aluminum alkyl or hydride of a metal selected from Groups I-A, II-A, and III-B of the Periodic Table.

The SBC is present in amounts ranging from 7 to 20 wt. %, or 10 to 15 wt. %,

Oil Component: The gel comprises an oil or mixtures thereof. A substance (or a mixture of substances) is referred to as oil if it is liquid at a temperature of 25° C., is more viscous than water and cannot be mixed with water (trying to mix them will produce separated phases). Examples include fatty oils (mixtures of animal or vegetable fatty acid triglycerides), mineral oils and synthetic oils.

In some aspects, the oil includes a paraffinic oil, or an oil-enriched in paraffin. A paraffinic oil is characterized by the presence of hydrocarbons having from 12 carbon atoms to 50 carbon atoms. Alternatively, the paraffinic oil includes a paraffin having an average number of carbon atoms that is less than or equal to 20 (e.g., 16). In certain aspects, the paraffinic oil includes a paraffin having an average number of carbon atoms from 16 to 30.

In embodiments, the oil is any of a mineral oil, a GTL-based process oil, or olefin fluids such as $C_{16}$-$C_{18}$ internal olefin hydrocarbons, or a synthetic oil. Herein synthetic oil refers to those oils that include non-naturally occurring components derived through chemical processes. Suitable mineral oils may be naphthenic- or paraffinic-based. In embodiments, the oil comprises diesel, biodiesel and carboxylic acid esters such as 2-ethylhexyl oleate. Other non-limiting examples of oils suitable include Drakeol 34 (Calumet/Penreco), ESCAID® 110 or PRIMOL® 352 (Exxon Mobil), or Linpar® 1416 (Sasol Corp.) and SARALINE®185V (Shell), AlphaPlus® C1618 (Chevron Phillips).

The oil component is present in an amount from 80 wt. % to 93 wt. % based on the total weight of the gel composition, or at least 85 wt. %.

Other Components: The gel composition can comprise various other components, e.g., optional additives. The additives can be an additional styrenic polymer (i.e., other than the SBC of the type disclosed herein). For example, the mixture may comprise a hydrogenated styrene-isoprene (or styrene-ethylene/propylene) block copolymer, hydrogenated styrene-butadiene (or styrene-ethylene/butylene), or hydrogenated controlled distribution S-EB/S.

In embodiments, the additive is a hydrocarbon resin. Any hydrocarbon resin compatible with the S block of the polymer may be utilized. Examples include SYLVARES™ SA-140 from Kraton Corporation and KRISTALEX™ 5140 from Eastman.

In embodiments, the optional additives are selected from the group of fumed silica, precipitated silica, silica gel, organophilic clay, an antioxidant, corrosion inhibitors, stabilizers, corrosion indicators, metal deactivators and mixtures thereof. For example, antioxidants and other stabilizing ingredients can be added to protect the gel composition from degradation induced by heat, light and processing or during storage. Several types of antioxidants can be used, either primary antioxidants like hindered phenols or secondary antioxidants like phosphite derivatives or blends thereof. Examples of antioxidants included sterically hindered phenol type antioxidants and liquid phenolic antioxidants.

In embodiments, the gel composition comprises a rheology modifier to meet one or more user or process goals, such as the adjusting the flow properties of the gel composition. Examples include fumed silica or specialty clays such as attapulgites, bentonite, hectorite or attapulgite, or castor oil based thixotropes and the like.

In embodiments, the gel composition comprises a colorimetric indicator, of the type for use in the detection of metallic ions, e.g., a rare earth salt, a lithium salt, an alkali salt of dithiozone or of rubeanic acid chelating agent. In embodiments, the indicator is used to in conjunction with an absorbent carrier then incorporated into the oil gel.

The optional additives can be incorporated in amounts ranging from 0.001 wt. % to 4 wt. % based on the total weight of the gel composition, or up to 10 wt. %, or up to 8 wt. %, or at least 0.5 wt. %. For example, an antioxidant can be present at 0.5 wt. %.

Method for Making: A gel composition comprising a SBC, an oil, and optionally additives, all of the type disclosed herein, may be prepared using any suitable methodology. A method of preparing the gel may comprise heating the oil (e.g., mineral oil) to a temperature of 130° C., and then dissolving the SBC into the preheated oil with high shear mixing for a suitable time period to produce a homogeneous mixture. The mixture may be aged for some time period of equal to or greater than 8 hours, or greater than 12 hours. Alternatively, the components (e.g., SBC, oil, optional additives) can mixed together at low shear at 25° C. The mixture can then be heated to 120° C.-150° C. until the SBC is completely dissolved in the oil. The composition can then be cooled to 25° C., optionally under vacuum, to remove any entrapped air bubbles.

Properties: In embodiments, the gel composition is characterized as having a high viscosity at 25° C. and as low viscosity as possible at 100° C. to enable easy gel production, i.e. mixing, and further processing. In embodiments, the composition has a viscosity at 25° C. and shear rate of 10/s from 75 Pa·s to 200 Pa·s, or from 100 Pa·s to 200 Pa·s.

In embodiments, the composition has a ratio of viscosity measured at 25° C. at 10/s shear rate to a viscosity measured at 100° C. at 10/s shear rate ranging from 4:1 to 20:1; or from 5:1 to 15:1.

In embodiments, the gel composition has a drop point from 100° C. to 250° C., or from 120° C. to 225° C., or at least 125° C.

In embodiments, the gel composition has a cone penetration at 25° C. from 200 decimillimeter (dmm) to 600 dmm, or at least 250 dmm.

In embodiments, the gel composition is characterized by an oil separation at 100° C. from 0.001% to 5%, or from 0.001% to less than 2%, or alternatively 0.

Applications: The gel compositions can be used in a variety of applications, e.g., filling and flooding gels in cables, as components in the manufacture of cosmetics, and as components of wellbore-servicing compositions and as corrosion inhibiting coatings for metal.

Examples include components of an oilfield servicing composition such as insulating packer fluids, transportation slurries, drilling muds, and drill-in fluids. Alternatively, the gel compositions may be components of a protective material for a transmission component such as thixotropic greases or flooding gels for fiber optic cables or filling gels for copper cables. Alternatively, the gel compositions may function as an additive for personal care products such as cosmetic oils and greases. Additional examples include heat transfer fluids, gels for corrosion resistance, post tensioning, cosmetics and personal care, cleaning and degreasing agents, process oils, agricultural gels for seeds, crop protection and grain dust suppression, textile coatings, concrete molds, shoe polish, paint, paint remover, furniture oils, wood preservatives, heating or cooking fuel, potting gels (LED, seismic, etc.), base stock oils, and metal working fluids.

In applications such as making cables, at least a wire, a fiber optic guide, etc. is positioned into a sleeve. The sleeve is subsequently filled with the oil gel composition to protect the wire/fiber optic guide from water ingress.

EXAMPLES

The examples are given by way of illustration only.

Example 1

Table 1 lists the components incorporated in exemplary oil gel compositions.

TABLE 1

| Material | Description | Characteristics |
| --- | --- | --- |
| SEP-1 | Selectively hydrogenated styrene-isoprene diblock copolymer | PSC = 37%, PS block MW = 37 kg/mol Molecular Weight = 150 kg/mol |
| SEP-2 | Selectively hydrogenated styrene-isoprene diblock copolymer | PSC = 28%, PS block MW = 37 kg/mol Molecular Weight = 200 kg/mol |
| S-EB/EP | Selectively hydrogenated styrene-butadiene/isoprene copolymer | PSC = 27%, PS block MW = 21 kg/mol Butadiene/Isoprene ratio = 20/80 Molecular Weight = 125 kg/mol |
| Oil | Primol 352 | Paraffinic Mineral Oil |
| Antioxidant | Irganox 1010 | Phenolic Stabilizer |

Oil gel compositions as shown in Table 2 were made by mixing the polymer, antioxidant (0.1% wt) and oil at 130° C. for 2 hours with a low shear mixer at 350 rpm.

TABLE 2

| Polymer | SEP-1 | SEP-2 | S-EB/EP |
| --- | --- | --- | --- |
| Concentration (% w) | 8 | 8 | 8 |
| Viscosity at 25° C. (Pa · s) | | | |
| at 6/s | 23.4 | 53.4 | 40.6 |
| at 200/s | 4.9 | 8.9 | 8.6 |
| Thixotropic ratio | 4.8 | 6.0 | 4.7 |
| Cone Penetration (dmm) | 360 | 320 | 370 |
| Drop Point (° C.) | 190 | 192 | 140 |

All gels were cooled down to room temperature and conditioned for at least 16 hours before the gel was tested for viscosity, drop point, cone penetration and oil separation. Dynamic viscosities were measured at 25° C., shear ramp applied with a Haake Rheostress 150 rheometer in cone/plane geometry with cone diameter of 20 mm and 1 degree angle. At 8 wt. % polymer loading, oil gels with SEP-2 and S-EB/EP show significantly higher viscosities at all shear rates applied in comparison to oil gel with SEP-1. The thickening power of the polymers SEP-2 and S-EB/EP is much stronger than for SEP-1. All three gels showed little or no oil separation of 0 wt %.

Example 2

In some applications, it is desirable for the oil gel to exhibit high viscosity at room temperature and relatively low viscosity at elevated temperature to facilitate the production process, and to enable further processing of the oil gel. In this example, oil gel compositions with higher concentrations were made according to the procedure described in Example 1 with 8 wt. % polymer content in Primol 352 oil.

Oil gels with 13 wt. % S-EP-1 and 13 and 14 wt % S-EB/EP were successfully produced with this method. Oil gels with SEP-1 at 17.5 wt. % and with SEP-2 at 13 wt. % could not be made with this procedure. Due to the very high viscosity at the production temperature of 130° C., and even at 150° C., this oil gel could not be homogenized. These gels could only be made in a Z-blade mixer at 160° C., wherein the polymer was pre-blended with 200 phr oil during 30 minutes. This pre-blend was added to the Z-blade mixer, which was heated to 160° C. When the mix starts to melt, as indicated by an increase of torque, a small additional quantity of oil was added to the Z-blade container. The oil addition and waiting period for torque increase allowed the desired oil gel composition to be reached, but removing the oil gel from the Z-blade was difficult with the high viscosity of the oil gel.

Table 3 shows the viscosities of oil gels with high concentration of polymer. The viscosity was measured at 25° C. and 100° C. at a shear rate of 10/s. At a polymer loading of 13 wt. % (and 17.5% for oil gel with SEP-1) oil gels with SEP-2 and S-EB/EP (and at 14%) show significantly higher viscosities at 25° C. than oil gel with SEP-1. The thickening power of the polymers SEP-2 and S-EB/EP is much stronger than for SEP-1.

TABLE 3

| Polymer | SEP-1 | SEP-1 | SEP-2 | S-EB/EP | S-EB/EP |
|---|---|---|---|---|---|
| Concentration (% w) | 13 | 17.5 | 13 | 13 | 14 |
| Viscosity 10/s (Pa · s) | | | | | |
| at 25° C. | 38 | 95 | 140 | 120 | 145 |
| at 100° C. | 9 | 46 | 30 | 13 | 15 |
| Ratio viscosity 25 C./100 C. | 4.5 | 2.1 | 4.7 | 9.2 | 9.6 |
| Drop Point (° C.) | 229 | >250 | 222 | 167 | 176 |

The S-EB/EP shows significantly better performance in this regard with 25° C./100° C. viscosity ratios of 9.2 and 9.6 as compared to traditional SEP polymers with ratios of approximately 2-5. SEP-1 and S-EB/EP show attractively low viscosities at 100° C., which enables an easy production process and easy further processing of the gel via pumping or pouring. SEP-2 shows very high viscosity at 100° C. and further processing is difficult without applying high shear or techniques not commonly used. At room temperature, both the S-EB/EP and SEP-2 polymers show very high viscosity, indicating a very strong thickening effect, while SEP-1 shows insufficient thickening. The examples show that the polymer structure of S-EB/EP diblock has an overall improved combination of oil gel composition performance and viscosity to enable both easy processing with improved thickening efficiency.

Unless defined otherwise, all technical and scientific terms used herein have the same meanings as commonly understood by one with skill in the art to which the disclosed disclosure belongs. As used herein, the term "comprising" and variations thereof as used herein is used synonymously with the term "including" and variations thereof and are open, non-limiting terms, meaning including elements or steps that are identified following that term, but any such elements or steps are not exhaustive, and an embodiment can include other elements or steps. Although the terms "comprising" and "including" have been used herein to describe various aspects, the terms "consisting essentially of" and "consisting of" can be used in place of "comprising" and "including" to provide for more specific aspects of the disclosure and are also disclosed.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items.

Unless otherwise specified, the recitation of a genus of elements, materials or other components, from which an individual component or mixture of components can be selected, is intended to include all possible sub-generic combinations of the listed components and mixtures thereof.

The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. To an extent not inconsistent herewith, all citations referred to herein are hereby incorporated by reference.

The invention claimed is:

1. An oil gel composition comprising:
    80 to 93 wt. % oil;
    between 7 to 20 wt. % of a selectively hydrogenated diblock copolymer consisting essentially of an A block and a B block and having a formula A-B,
        where the A block comprises polymerized monoalkenyl arene units or a combination of polymerized monoalkenyl arene units and diene units,
        wherein before hydrogenation the B block is a polydiene copolymer comprising butadiene and isoprene at a ratio of 2:98 to 98:2, the B block having a vinyl content ranging from 5 to 20%,
    wherein the selectively hydrogenated diblock block copolymer has molecular weight from 80 kg/mol to 150 kg/mol, and a poly alkenyl arene content from 15% to 40%;
    up to 10 wt.-% of optional additives; and
    wherein the oil gel composition is for use in a cable as a cable gel, the cable gel is characterized by:
        a drop point from 100 to 250° C.,
        oil separation at 100° C. from 0% to 2%, and
        a ratio of viscosity measured at 25° C. at 10/s shear rate to viscosity measured at 100° C. at 10/s shear rate ranging from 4:1 to 20:1.

2. The oil gel composition of claim 1, wherein the oil gel composition has a viscosity at 25° C. and shear rate of 10/s from 100 Pa·s to 200 Pa·s.

3. The oil gel composition of claim 1, wherein the oil gel composition has a cone penetration at 25° C. from 200 dmm to 600 dmm.

4. The oil gel composition of claim 1, wherein the monoalkenyl arene units comprises styrene, alpha-methylstyrene, para-methylstyrene, vinyl toluene, vinylnaphthalene, diphenyl ethylene, para-butyl styrene, or mixtures thereof.

5. The oil gel composition of claim 1, wherein the B block comprises butadiene and isoprene at a ratio of 5:95 to 60:40.

6. The oil gel composition of claim 1, wherein the selectively hydrogenated diblock copolymer has a polystyrene alkenyl arene content ranging from 25 to 35%, based on the total weight of the selectively hydrogenated block copolymer.

7. The oil gel composition of claim 1, where the selectively hydrogenated diblock copolymer is present in an amount of 10 to 15 wt. %, based on the total weight of the oil gel composition.

8. The oil gel composition of claim 7, wherein the optional additive is a colorimetric indicator for use in the detection of metallic ions.

9. The oil gel composition of claim 8, wherein the colorimetric indicator is selected from the group of rare earth salts, lithium salts, alkali salts of dithiozone, a rubeanic acid chelating agent, and mixtures thereof.

10. The oil gel composition of claim 1, where the oil is selected from mineral oil, paraffinic oil, Fischer-Tropsch derived oil, or synthetic oil or a mixture thereof.

11. The oil gel composition of claim 1, wherein the oil is present in an amount of at least 85 wt. %.

12. A cable comprising the oil gel composition of claim 1, wherein the oil gel provides protection from water ingress or corrosion.

13. A cable comprising the oil gel composition of claim 1, wherein the cable is a post-tensioning cable.

14. A method for making a filling composition for cable gels, the method comprising: dissolving between 7 to 20 wt. % of a selectively hydrogenated diblock copolymer and up to 10 wt. % of optional additives in 80 to 93 wt. % of an oil selected from a paraffinic oil, oil-enriched in paraffin, a mineral oil, a Fischer-Tropsch derived oil, a synthetic oil, or mixtures thereof, wherein the selectively hydrogenated diblock copolymer consists essentially of a diblock copolymer of formula A-B, where A block comprises polymerized monoalkenyl arene units or a combination of polymerized monoalkenyl arene units and diene units, wherein before hydrogenation the B block is a polydiene copolymer comprising butadiene and isoprene at a ratio of 2:98 to 98:2, the B block having a vinyl content ranging from 5 to 20%, wherein the diblock copolymer has molecular weight from 80 kg/mol to 150 kg/mol, and a polyalkenyl arene content from 15% to 40%; and wherein the filling composition is for use in a cable as a cable gel, the cable gel is characterized by: a drop point from 100 to 250° C., oil separation at 100° C. from 0% to 2%, and a ratio of viscosity measured at 25° C. at 10/s shear rate to viscosity measured at 100° C. at 10/s shear rate ranging from 4:1 to 20:1.

15. A method for making a post-tension cable, the method comprising: placing at least a wire into a flexible sleeve, filling the sleeve with an oil gel composition comprising: 80 to 93 wt. % of an oil selected from a paraffinic oil, oil-enriched in paraffin, a mineral oil, a Fischer-Tropsch derived oil, a synthetic oil, or mixtures thereof; up to 10 wt. % of optional additives; and 10 to 20 wt. % of a selectively hydrogenated diblock copolymer, wherein the selectively hydrogenated diblock copolymer consists essentially of a diblock copolymer of formula A-B, where A block comprises polymerized monoalkenyl arene units or a combination of polymerized monoalkenyl arene units and diene units, wherein before hydrogenation the B block is a polydiene copolymer comprising butadiene and isoprene at a ratio of 2:98 to 98:2, the B block having a vinyl content ranging from 5 to 20%, wherein the diblock copolymer has molecular weight from 80 kg/mol to 150 kg/mol, and a polyalkenyl arene content from 15% to 40%; and wherein the oil gel composition is for use in a cable as a cable gel, the cable gel is characterized by: a drop point from 100 to 250° C., oil separation at 100° C. from 0% to 2%, and a ratio of viscosity measured at 25° C. at 10/s shear rate to viscosity measured at 100° C. at 10/s shear rate ranging from 4:1 to 20:1.

16. The method of claim 15, wherein the oil gel composition has a cone penetration at 25° C. from 200 dmm to 600 dmm.

* * * * *